US007665971B1

(12) United States Patent
Glickman et al.

(10) Patent No.: US 7,665,971 B1
(45) Date of Patent: Feb. 23, 2010

(54) METHOD OF OBTAINING REQUIRED POWER ON DEMAND FROM AN ENGINE

(75) Inventors: Myron Glickman, Arlington Heights, IL (US); Harvey E. Schmidt, Flossmoor, IL (US); Daniel Olson, Orland Park, IL (US); Steven Pfeifenroth, Orland Park, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 12/014,230

(22) Filed: Jan. 15, 2008

(51) Int. Cl.
*F04B 49/00* (2006.01)
*F16D 31/02* (2006.01)

(52) U.S. Cl. .......................................... 417/34; 60/431

(58) Field of Classification Search .................. 60/431; 123/378; 212/71; 417/34
See application file for complete search history.

(56) References Cited

U.S. PATENT DOCUMENTS 3,952,511 A * 4/1976 Turner et al. .................. 60/430
4,316,696 A * 2/1982 Hoyerman .................. 414/542
4,667,834 A * 5/1987 Lanigan et al. .............. 212/288
5,214,916 A * 6/1993 Lukich ........................ 60/431
5,479,778 A * 1/1996 Toyooka et al. ............... 60/431
6,021,911 A * 2/2000 Glickman et al. ........... 212/345
6,282,891 B1 * 9/2001 Rockwood .................. 60/422
6,305,162 B1 * 10/2001 Cobo et al. .................. 60/422
6,314,727 B1 * 11/2001 Prabhu et al. ................ 60/431
6,425,370 B1 * 7/2002 Kramer ...................... 123/357
6,672,055 B1 * 1/2004 Konishi et al. ................ 60/449
2002/0087244 A1 * 7/2002 Dix et al. ...................... 701/50
2006/0102578 A1 * 5/2006 Zakula et al. .............. 212/283

* cited by examiner

*Primary Examiner*—Stephen K Cronin
*Assistant Examiner*—David Hamaoui
(74) *Attorney, Agent, or Firm*—Drinker Biddle & Reath LLP

(57) ABSTRACT

A control system and method for obtaining power on demand from a diesel engine in order to operate vehicle functions and accessories. The method comprised of: (1) determining a flow rate necessary to operate each of a plurality of function hydraulic pumps and an vehicle drive pump associated with the engine; (2) comparing the flow rates of the various hydraulic pumps to determine the greatest flow rate; (3) establishing an engine speed necessary to deliver the greatest flow rate; (4) comparing the engine speed necessary to deliver the greatest flow rate with a current engine speed; and (5) adjusting the current engine speed to provide the greatest flow rate required.

9 Claims, 3 Drawing Sheets

METHOD OF OBTAINING REQUIRED POWER ON DEMAND FROM AN ENGINE

FIELD OF THE INVENTION

This invention pertains to a method for obtaining power from an engine and, more particularly, a method for obtaining power on demand at a particular time to drive a function or accessory powered by the engine.

BACKGROUND OF THE INVENTION

Current power technology on mobile diesel hydraulic gantry cranes employs a diesel engine running at constant speed to drive one or more hydraulic pumps that are used to drive accessories powered by the engine. These pumps supply pressurized hydraulic fluid to various hydraulic actuators, which in turn operate various crane functions such as hoist, trolley, and drive. Controlling the magnitude and direction of the hydraulic fluid flow rate to the various crane hydraulic actuators controls the magnitude and direction of the crane function. This control of the hydraulic flow rate is currently accomplished by a number of methods including direct electrical control of the displacement of a variable displacement hydraulic pump, and electric proportional control of a pump flow rate using proportional direction control valves with fixed displacement pumps or variable displacement pumps. This can entail operating a function control and depressing the crane drive pedal at the same time.

The current practice of running the engine at a constant high speed while operating the crane has several disadvantages such as: (a) high engine speed even when there is little or no flow demand; (b) higher total fuel consumption due to constant high engine speed; and (c) higher total noise due to high engine speed. Each of these practices has disadvantages in that they increase operating costs by using excess fuel, increase engine wear by operating unnecessarily at higher speeds, and increase noise pollution and, consequently, operator fatigue. For these reasons, a method for controlling an engine such that the engine provided the necessary power only when it was demanded by the operator would be an important improvement in the art.

BRIEF SUMMARY OF THE INVENTION

The invention involves a system and method for controlling the engine speed in response to operator functional commands. The inventive system and method allows the engine to operate at an engine speed that will provide only the functional flow demand necessary to provide the function speed required by the operator command. This functional flow also allows the engine to operate at the proper point on its torque speed curve so as to provide the required engine torque necessary to provide the required flow at the required pressure to function at the rated load of the crane. No action other than the crane operator's function commands via a control input such as a joystick movement are required to achieve the engine speed and power control.

DETAILED DESCRIPTION OF THE INVENTION

Figure 1:
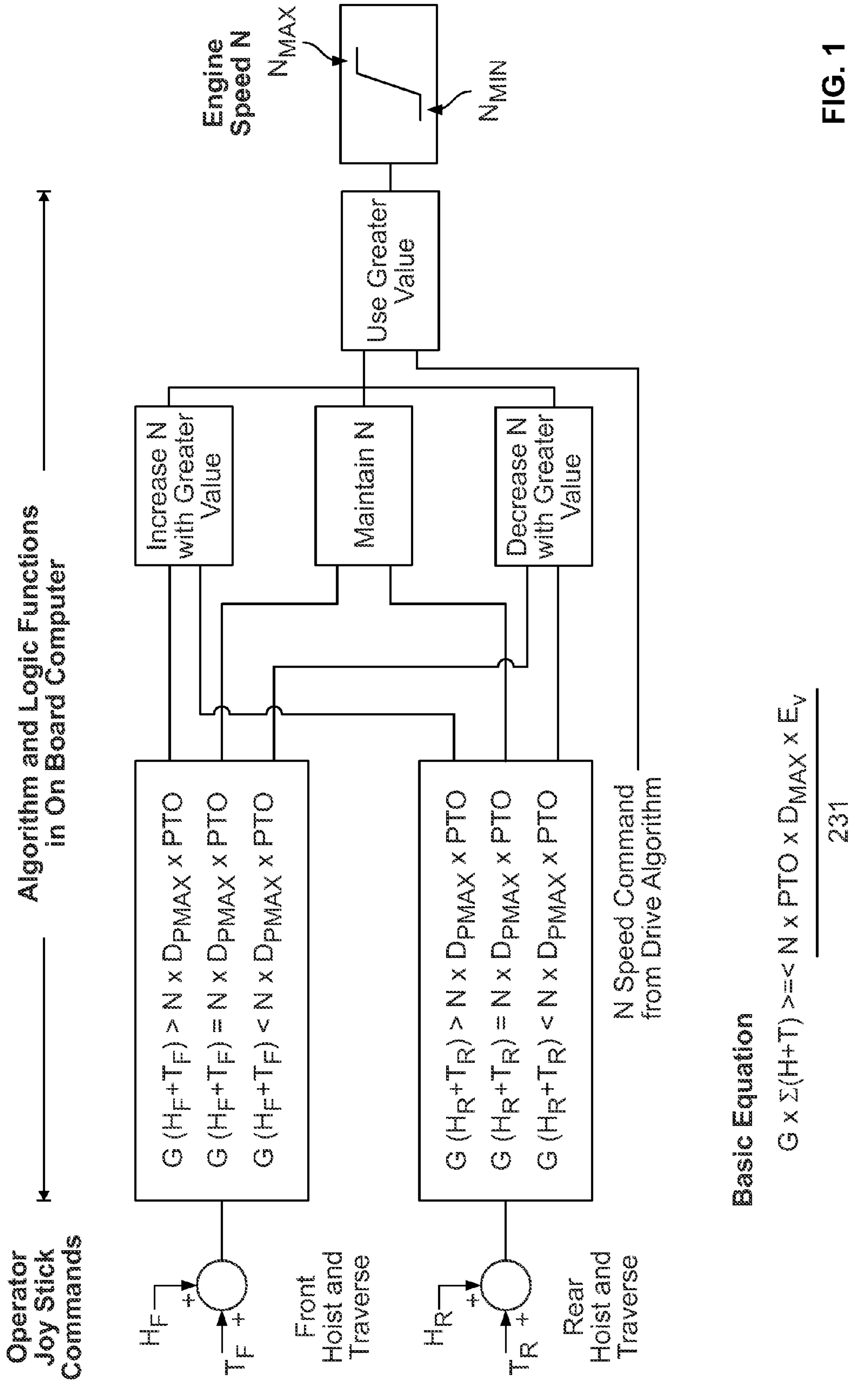
FIG. 1 is a functional block diagram of the control algorithm for the hoist and traverse (trolley) functions.

The invention involves a control system and method for obtaining power on demand from a diesel engine in order to operate vehicle functions or accessories. The inventive method is comprised of: (1) determining a flow rate necessary to operate each of a plurality of function hydraulic pumps and a vehicle drive pump driven by the engine; (2) comparing the flow rates of the various hydraulic pumps to determine the greatest flow rate; (3) establishing an engine speed necessary to deliver the greatest flow rate; (4) comparing the engine speed necessary to deliver the greatest flow rate with a current engine speed; and (5) adjusting the current engine speed to provide the greatest flow rate required.

Currently heavy lift crane operations run at full engine speed all of the time. It has been shown that by adjusting the engine speed between idle and full speed so as to provide the minimum engine speed necessary to provide the greatest hydraulic flow rate required on demand at a given time results in a fuel savings of approximately 40% as compared to running the engine at maximum speed at all times during operation. This results in a significant cost savings for operators.

In an embodiment of the inventive method, the plurality of function pumps include at least one of a group comprised of a front hoist pump and a trolley pump, a rear hoist and a rear trolley pump. In this embodiment, the flow rates of the front hoist and trolley are added together to determine an overall flow rate for the front function pumps. The flow rate of the rear hoist and trolley are also added together determine an overall flow rate for the rear function pumps. The two overall flow rates resulting from these summations are compared with one another and the engine speed required satisfying the highest hoist and trolley flow rate is computed by the hoist and traversing algorithm. The resulting engine speed is compared with the engine speed calculated by the drive algorithm. The greatest engine speed calculated by the two algorithms is communicated to the electronic engine control unit ("ECU") where the current engine speed is adjusted, if need be, to satisfy the maximum flow rate.

The invention also involves a control system 10 (FIG. 3) for monitoring and adjusting engine performance, the control system 10 is comprised of a flow rate input for a drive pump, at least one flow rate input for a function drive pump, a memory device 14 storing computer readable instructions for determining required engine speed, and an optimizing device 16 for receiving the flow rate of the drive pump and the at least one flow rate of a function and processing the inputs according to the computer readable instructions stored on the memory device, said optimizing device determining the required engine rpm to satisfy the maximum flow rate demand and comparing the required engine rpm with the existing engine rpm.

In an embodiment, the system allows for the comparison of multiple flow rates in that the optimizing device sums together a plurality of flow rates associated with a plurality of function or accessory pumps. The sum of these flow rates is then compared with the flow rate for the drive pump to determine the greatest flow rate required for operating the functions of the vehicle, such as a crane. In an embodiment, the flow rate input for the vehicle drive pump is received via a drive pedal located in an operator's cab. In still another embodiment, the at least one flow rate input of an accessory drive pump is received via a joy stick input on an operator's console.

The control system is applicable to a crane system, which uses electronic control and variable displacement hydraulic pumps of the electrical control and load sensing type. FIGS.

Figure 2:
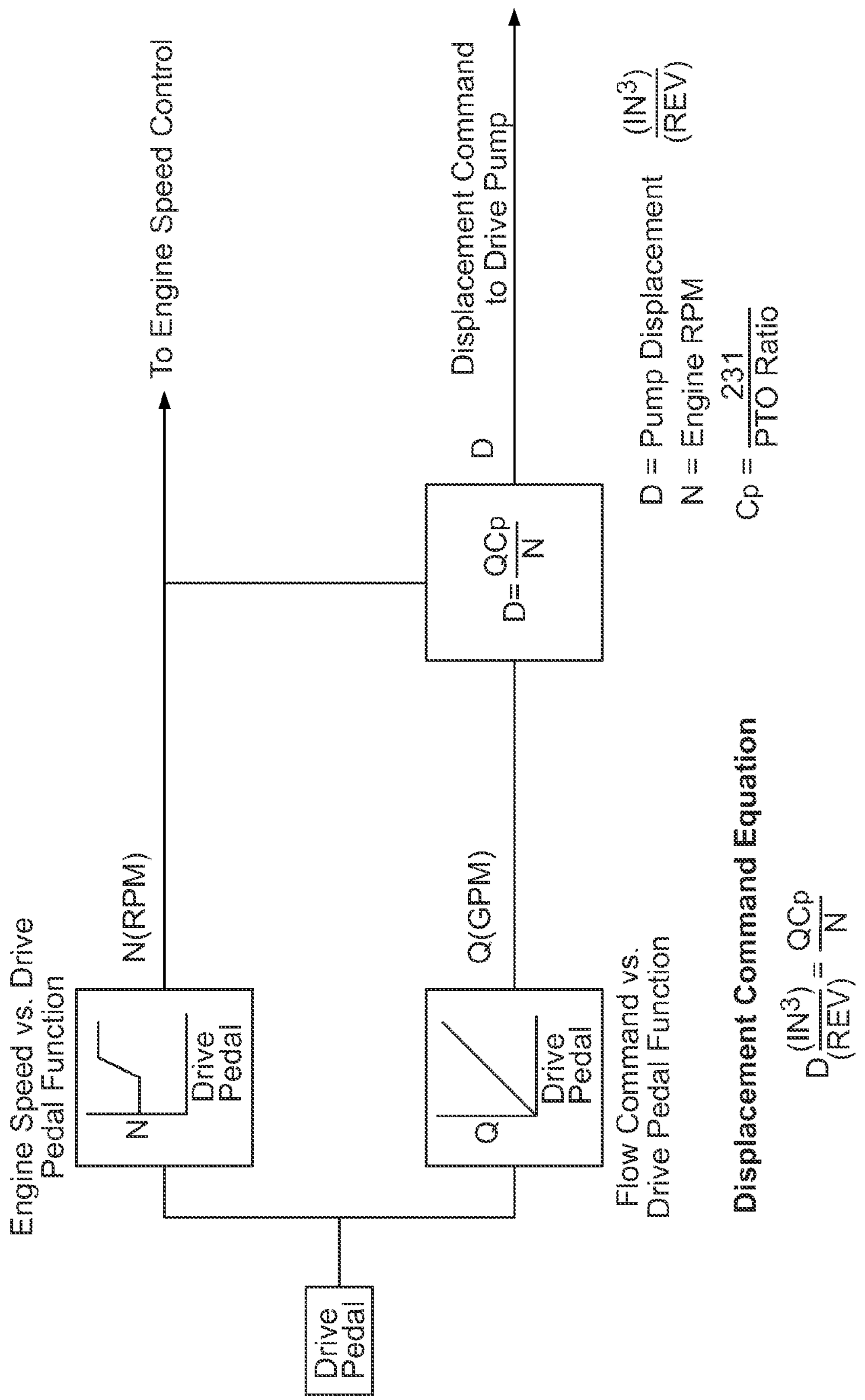
FIG. 2 is the control algorithm for the drive function.

1 and 2 outline the control algorithm for the hoist and traverse functions and the drive function of a crane, respectively. The symbols used in FIGS. 1 and 2 are defined as follows:

$H_F$==Front Hoist Speed Command from Joy Stick Expressed as a Flow Rate (i.e., GPM)

$T_F$=Front Trolley Speed Command from Joy Stick Expressed as a Flow Rate (i.e., GPM)

$H_R$=Rear Hoist Speed Command from Joy Stick Expressed as a Flow Rate (i.e., GPM)

$T_R$=Rear Trolley Speed Command from Joy Stick Expressed as a Flow Rate (i.e., GPM)

N=Engine Speed sensed from the engine (RPM)

PTO=Pump Drive Ratio (Pump Speed/Engine Speed)

$D_{PFMAX}$=Maximum Displacement of Front Hoist and Traverse Pump ($in^3$/rev.)

$D_{PRMAX}$=Maximum Displacement of Rear Hoist and Traverse Pump ($in^3$/rev.)

$E_v$=Hoist/Traverse Pump volumetric efficiency

G=Gain Value (Adjustable)

$$G\times(H_F+T_F)>=<N\times PTO\times D_{PFMAX}\times E_v/231$$

$$G\times(H_R+T_R)>=<N\times PTO\times D_{PRMAX}\times E_v/231$$

Different algorithms are required for hoist/traverse and drive flow rates because of differences in the hydraulic systems. The hoist/traverse system is load sensing hydraulic with proportional valves and load sensing variable displacement pumps. The drive system uses an electric proportional over center drive pump.

The gain G of the hoist and traverse algorithm is selected so that the engine will always operate at sufficient speed based on the engine torque speed curve so that the engine will produce the torque required to drive the hoist/traverse pump at the displacement required to produce the required functional flow at the pressure required to handle the rated load. Since the hoist and trolley functions can be operated independently the hoist and traverse algorithm is set up so that the highest demand controls the engine.

The drive algorithm as shown in FIG. 2 employs shaping functions, which convert drive pedal motion into two separate signals. One signal represents engine speed command and the other signal represents drive pump flow rate demand. The onboard crane computer performs the division function to develop the displacement signal for the drive pump. The engine speed function is shaped so that the engine is always operating at a speed that produces sufficient torque to drive the drive pump at the displacement that produces the required drive flow rate.

Figure 3:
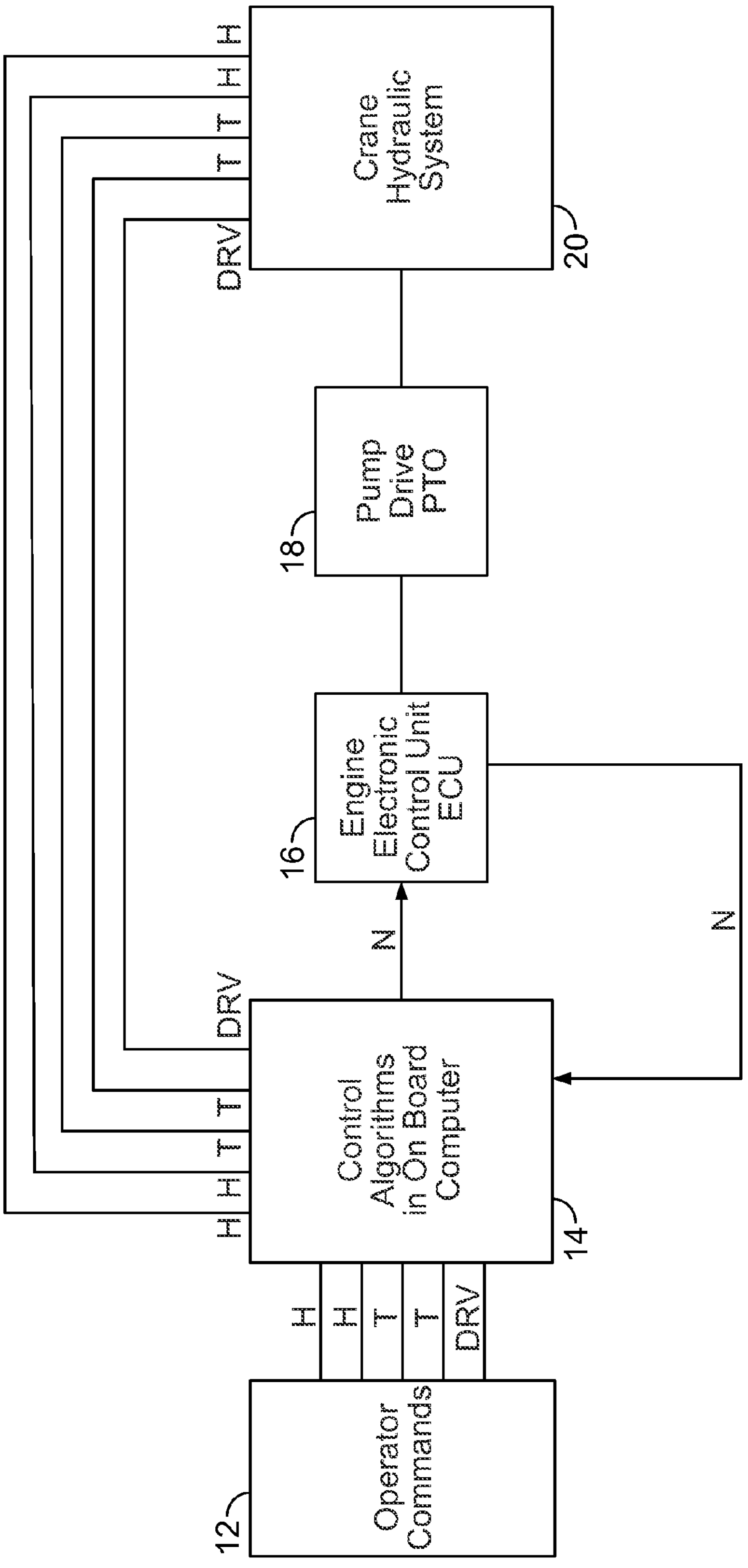
FIG. 3 is a block diagram of showing a control system for a crane used with the invention.
Figure 3:
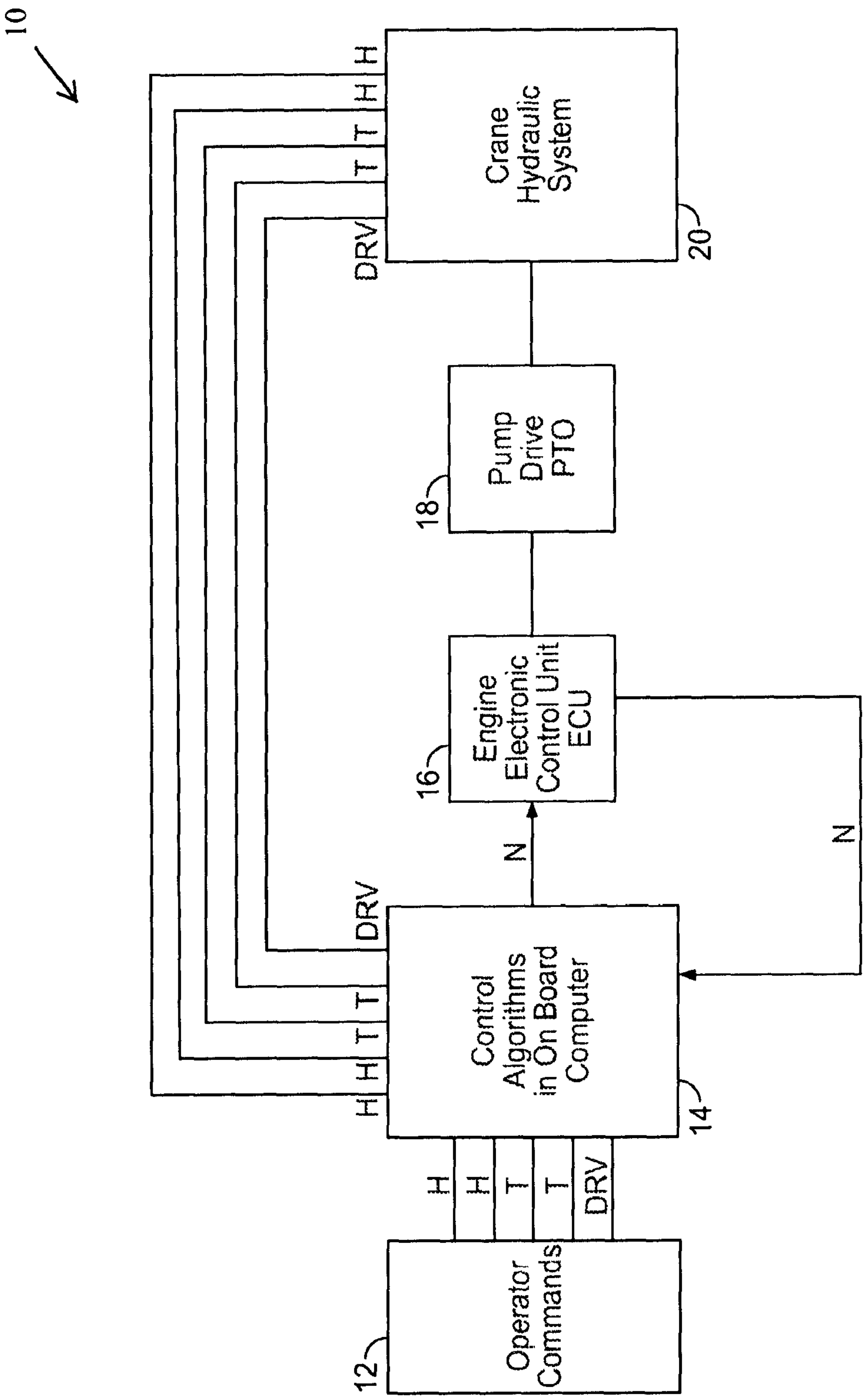

A crane system block diagram is shown in FIG. 3. By controlling engine speed in response to the operator commands 12 according to the algorithms described the engine automatically provides power based on the total functional demand. When no crane functions are commanded the engine operates at low speed. Most cranes have very intermittent duty cycles where short periods of time require high power such as when lifting loads at or near full load at full speed. The remainder of the time the power demand is relatively low. The system herein described allows the engine to supply the required power on demand and allows the engine to go to low speed automatically when there is little or no demand. In cases where there is a significant amount of low demand operation this system will provide for significant reductions in fuel consumption, longer engine life and lower average noise level.

When in operation, a crane operator positions a control input such as a joy stick on the operator's console (not shown) to establish the flow rate required to operate a hoist or trolley. In an embodiment of the invention, the crane may have both a front and rear hoist and trolley. In this embodiment, the operator initiates a command via a control input, such as joy stick, as to the amount of flow rate required to operate a hydraulic pump used to drive the front hoist as well as a command for the pump to drive the front trolley. Similar commands are inputted for the rear hoist and trolley.

Once the commands are input, the control system utilizes the flow rate equation shown in FIG. 1 to determine the required engine speed to satisfy the flow demand for the forward hoist and trolley. The same calculation is made to determine the engine speed required to satisfy the rear hoist and trolley flow demand.

As shown in FIG. 1, the gain comparisons for the flow rates for both the front and rear hoist and traverse are compared with each other with the greatest flow command being selected as the controlling value. As seen in FIG. 1, the required engine speed could be greater than, equal to, or less than the actual engine speed. If the speed required is greater than the engine speed, the engine speed is increased to a greater value necessary to achieve the greater flow rate. If the results are equal, engine speed is maintained at the original speed. Finally, if the required speed is less than the current engine speed, the engine speed is decreased to the speed necessary to satisfy the new flow rate.

When in operation, as the drive pedal is engaged, the drive algorithm converts the motion of the pedal into two separate signals, one for engine speed command and the other for drive pump flow rate, as shown in FIG. 2. The division function to develop the displacement signal for the drive pump is performed by the onboard crane computer. The engine speed function is shaped so that the engine is always operating at a speed that produces sufficient torque to drive the drive pump at the displacement that produces the required drive flow rate.

As shown in FIG. 3, when in operation, the operator commands 12 for the front and rear hoists, the front and rear traverse, and the vehicle drive pump being fed into the control algorithms in the on-board computer 14. The computer also receives an input of engine speed from the engine electronic control unit ("ECU") 16. When the on-board computer 14 determines which pump requires the greatest engine speed, the computer transmits a new engine speed, if necessary, to the ECU 16, thereby altering the speed of the engine and the pump drive 18. At the same time, the computer 14 transmits the flow rate command signal to the respective flow controlling device 20 for operation of the crane functions according to the operators input commands to allow for operation of the crane's functions or accessories.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for obtaining power on demand from a diesel engine to operate vehicle functions, the method comprised of:

determining, based on a motion of a first control, a function flow rate for each of a plurality of function hydraulic pumps, the plurality of function hydraulic pumps including a front group and a rear group, the front group comprised of a front hoist pump and a front traverse pump and the rear group comprised of a rear hoist pump and a rear traverse pump, and further determining, based on a drive pedal motion, a drive flow rate necessary to operate a vehicle drive pump driven by the engine;

adding the function flow rates of the front hoist pump and front traverse pump to determine a front overall flow rate for the front group;

adding the function flow rates of the rear hoist pump and rear traverse pump to determine a rear overall flow rate for the rear group;

determining a combined flow rate, the combined flow rate being the greater of the front overall flow rate and the rear overall flow rate;

determining a function engine speed that is the minimum engine speed necessary to support the combined flow rate;

determining a drive pump engine speed necessary to support the drive flow rate;

determining a final engine speed by selecting the larger of the function engine speed and the drive pump engine speed;

comparing the final engine speed with a current engine speed; and adjusting the current engine speed to the final engine speed.

2. The method of claim 1, wherein the first control is a joy stick.

3. A control system for monitoring and adjusting engine performance, the control system comprised of:

a drive flow rate input for a vehicle drive pump based on drive pedal motion;

a function flow rate input for a at least one function drive pump based on a joystick motion;

a memory device storing computer readable instructions for determining required engine speed; and an optimizing device for receiving and processing the drive flow rate of the vehicle drive pump and the function flow rate of at least one function drive pump according to the computer readable instructions stored on the memory device, said optimizing device determining the maximum minimum engine speed required to meet the maximum flow demand, the maximum flow demand being the greater of the drive flow rate and the function flow rate;

comparing said maximum flow demand with a an existing flow rate generated by an existing engine speed; and adjusting the existing engine speed to meet the maximum flow demand.

4. The control system of claim 3, wherein the at least one function drive pump is a plurality of function drive pumps and the optimizing device sums together a plurality of function flow rates associated with the plurality of function drive pumps.

5. The control system of claim 3, wherein the drive flow rate input for the vehicle drive pump is received via a drive pedal located in an operator's cab.

6. The control system of claim 3, wherein the at least one function flow rate input of a function drive pump is received via a control input on an operator's console.

7. The control system of claim 6, wherein the control input is a joy stick.

8. The method of claim 1 further comprised of sending a displacement signal to the vehicle drive pump based on the drive flow rate.

9. The method of claim 1, wherein the first control is disposed on an operator's control console.

* * * * *

UNITED STATES PATENT AND TRADEMARK OFFICE

CERTIFICATE OF CORRECTION

PATENT NO. : 7,665,971 B1
APPLICATION NO. : 12/014230
DATED : February 23, 2010
INVENTOR(S) : Myron Glickman et al.

It is certified that error appears in the above-identified patent and that said Letters Patent is hereby corrected as shown below:

In the drawings beginning on page 4, replace Sheet 3 of 3, Figure 3 with the attached drawing page on which an element number has been added.

In Claim 3, Column 6, line 10, "for a at least" should read --for at least--.

In Claim 3, Column 6, lines 18-19, "the maximum minimum engine" should read --the minimum engine--.

In Claim 3, Column 6, line 23, "with a an existing" should read --with an existing--.

Signed and Sealed this

Twentieth Day of April, 2010

David J. Kappos

David J. Kappos
*Director of the United States Patent and Trademark Office*